United States Patent
Duron et al.

(10) Patent No.: US 7,526,639 B2
(45) Date of Patent: Apr. 28, 2009

(54) METHOD TO ENHANCE BOOT TIME USING REDUNDANT SERVICE PROCESSORS

(75) Inventors: Mike Conrad Duron, Pflugerville, TX (US); Mark David McLaughlin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 11/352,696

(22) Filed: Feb. 13, 2006

(65) Prior Publication Data

US 2007/0192578 A1    Aug. 16, 2007

(51) Int. Cl.
G06F 9/00 (2006.01)
G06F 11/00 (2006.01)
G06F 15/177 (2006.01)

(52) U.S. Cl. .................. 713/1; 714/100; 714/10; 714/13

(58) Field of Classification Search ............ 713/1, 713/2; 714/100, 10, 11, 13
See application file for complete search history.

(56) References Cited

U.S. PATENT DOCUMENTS

| 5,642,506 A | * | 6/1997 | Lee ........................... 713/1 |
|---|---|---|---|
| 5,951,683 A | * | 9/1999 | Yuuki et al. ................ 713/1 |
| 6,233,680 B1 | * | 5/2001 | Bossen et al. ............... 713/1 |
| 6,336,185 B1 | | 1/2002 | Sargenti, Jr. et al. |
| 2003/0033409 A1 | | 2/2003 | King et al. |
| 2003/0188222 A1 | | 10/2003 | Abbondanzio et al. |
| 2004/0267894 A1 | | 12/2004 | Zaharias |
| 2005/0150151 A1 | | 7/2005 | Rawson, III |
| 2005/0240669 A1 | | 10/2005 | Khanna et al. |

FOREIGN PATENT DOCUMENTS

CN    1664784 A    9/2005

* cited by examiner

*Primary Examiner*—Mark Connolly
(74) *Attorney, Agent, or Firm*—Yee & Associates, P.C.; Libby Z. Handelsman

(57) ABSTRACT

A computer implemented method and system for enhancing boot time of a computer system. Initial program load firmware is initialized on a plurality of service processors. The plurality of service processors performs independent non-redundant initialization tasks concurrently as other independent non-redundant initialization tasks are performed by another service processor. Once the initialization tasks are completed, control is switched to a primary service processor within the plurality of service processors and runtime firmware is loaded by the primary service processor.

3 Claims, 5 Drawing Sheets

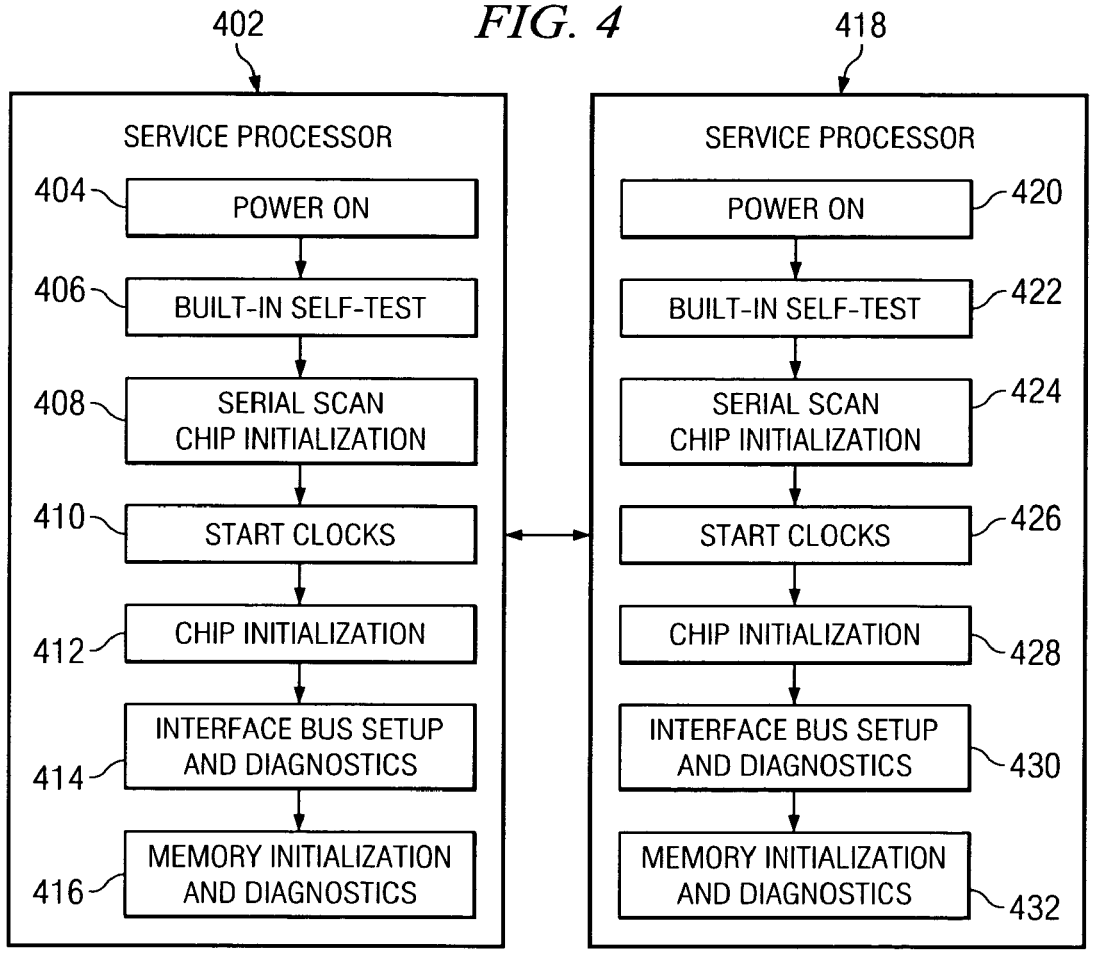

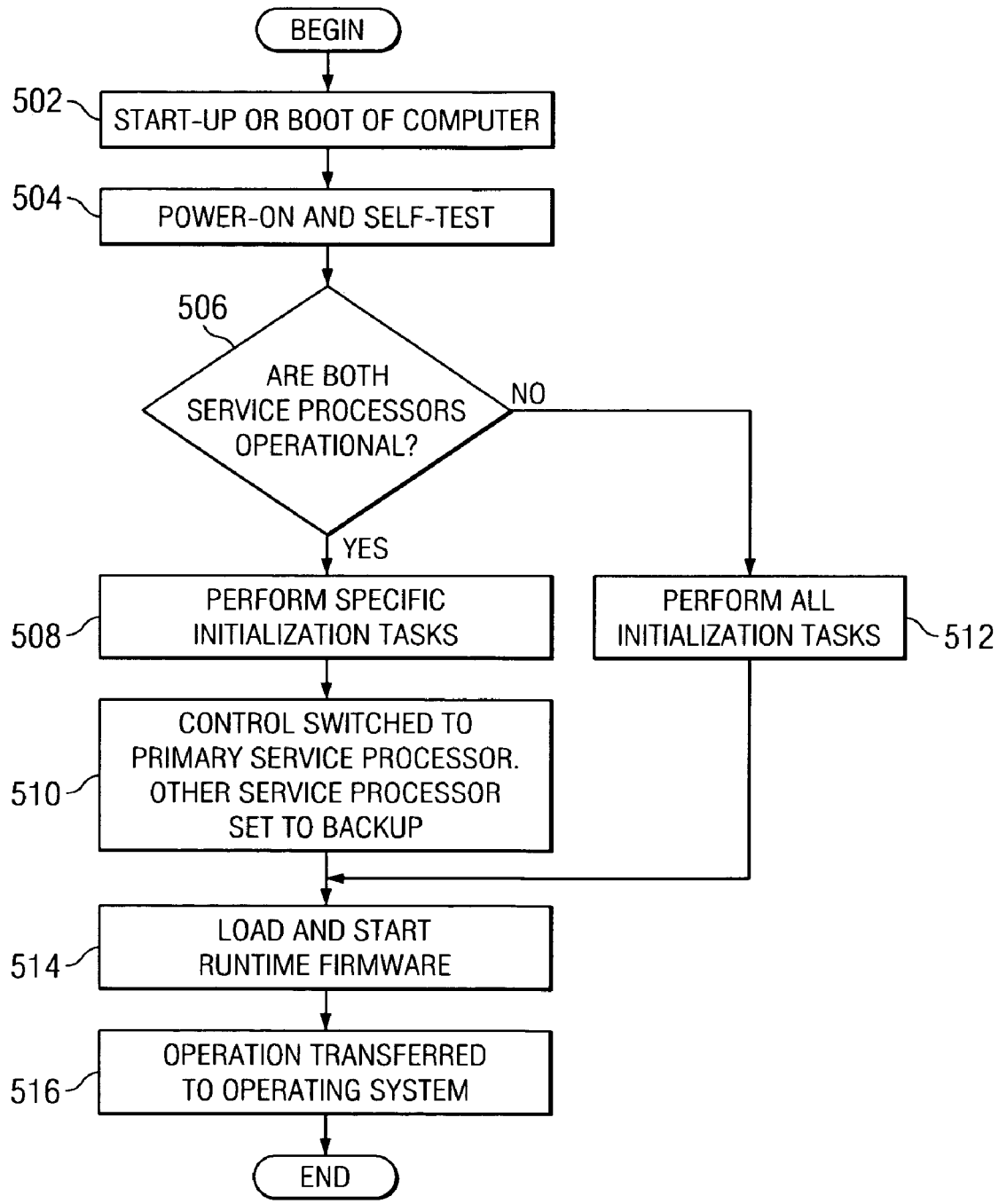

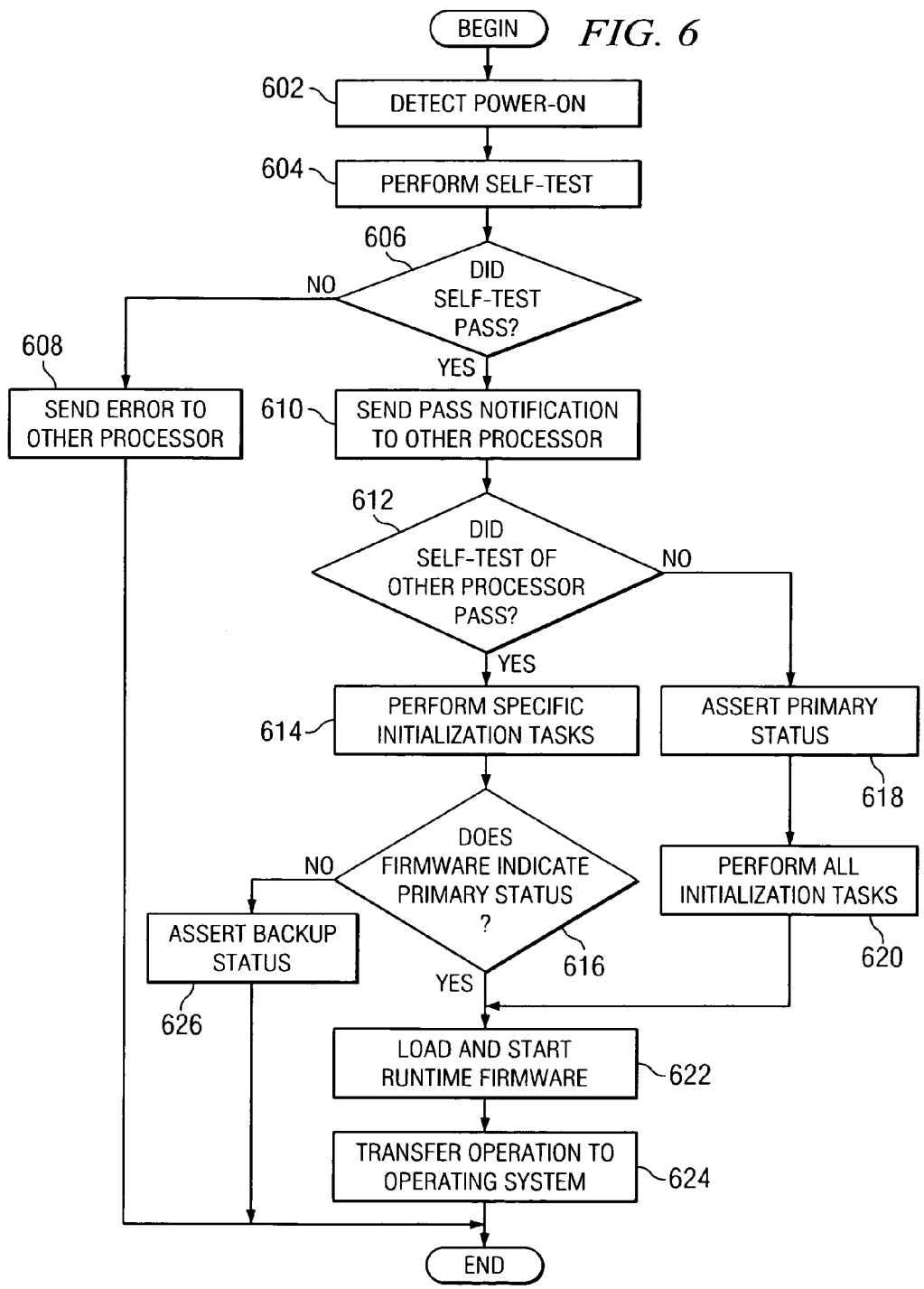

METHOD TO ENHANCE BOOT TIME USING REDUNDANT SERVICE PROCESSORS

BACKGROUND OF THE INVENTION

1. Field of the Invention

The present invention relates generally to an improved data processing system and in particular to a computer implemented method, data processing system, computer usable program code, and apparatus to enhance computer boot time in a data processing system. More specifically, the present invention relates to a computer implemented method, data processing system, computer usable program code, and apparatus for enhancing boot time in a data processing system using redundant parts.

2. Description of the Related Art

When a computer is started or booted, an initial program load occurs. This initial program load process is also referred to as a boot process in which instructions located on a read-only memory or a flash memory are automatically executed upon start-up or boot of the computer. A flash memory is a more common storage device for storing these instructions, which is also referred to as initial program load firmware. A flash memory is a device that retains instructions when no power is applied to the device. Further, flash memory devices may be modified through a program or software component also referred to as a flash update program. The initial program load firmware may be stored in one or more flash devices. This firmware searches for the operating system, loads the operating system, and then passes control to the operating system.

The firmware most often is located on one or more service processors. If more than one service processor exists in the computer system, one of the service processors is designated as a primary processor and is responsible for the entire boot up process until control is passed to the operating system. The other existing service processor(s) are redundant and are only used if the primary service processor fails. Thus, the boot up method using one service processor takes a considerable amount of time, especially when several nodes are involved.

SUMMARY OF THE INVENTION

The different aspects of the present invention provide a computer implemented method, data processing system, computer usable program code, and apparatus for enhancing boot time of a computer system. The present invention initializes initial program load firmware on a plurality of service processors. Initialization tasks are performed on the plurality of service processors and each service processor in the plurality of service processors performs independent non-redundant initialization tasks concurrently as other independent non-redundant initialization tasks are performed by another service processor in the plurality of service processors. As the initialization tasks are complete, control is switched back to a primary service processor within the plurality of service processors. Then a set of runtime firmware is loaded by the primary service processor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts an exemplary system initialization in accordance with a preferred embodiment of the present invention;

FIG. 5 is a flowchart depicting an enhanced boot time operation in accordance with a preferred embodiment of the present invention;

FIG. 6 is a flowchart depicting an exemplary firmware operation in accordance with a preferred embodiment of the present invention.

DETAILED DESCRIPTION OF THE PREFERRED EMBODIMENT

Figure 1:
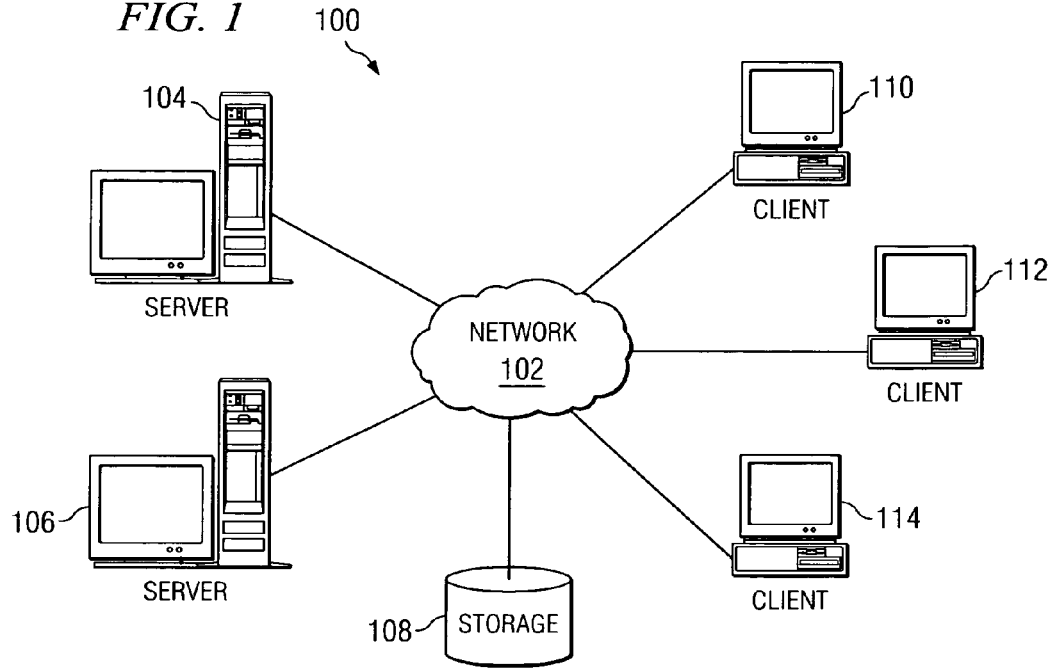
FIG. 1 depicts a pictorial representation of a network of data processing systems in which aspects of the illustrative embodiments may be implemented.
Figure 2:
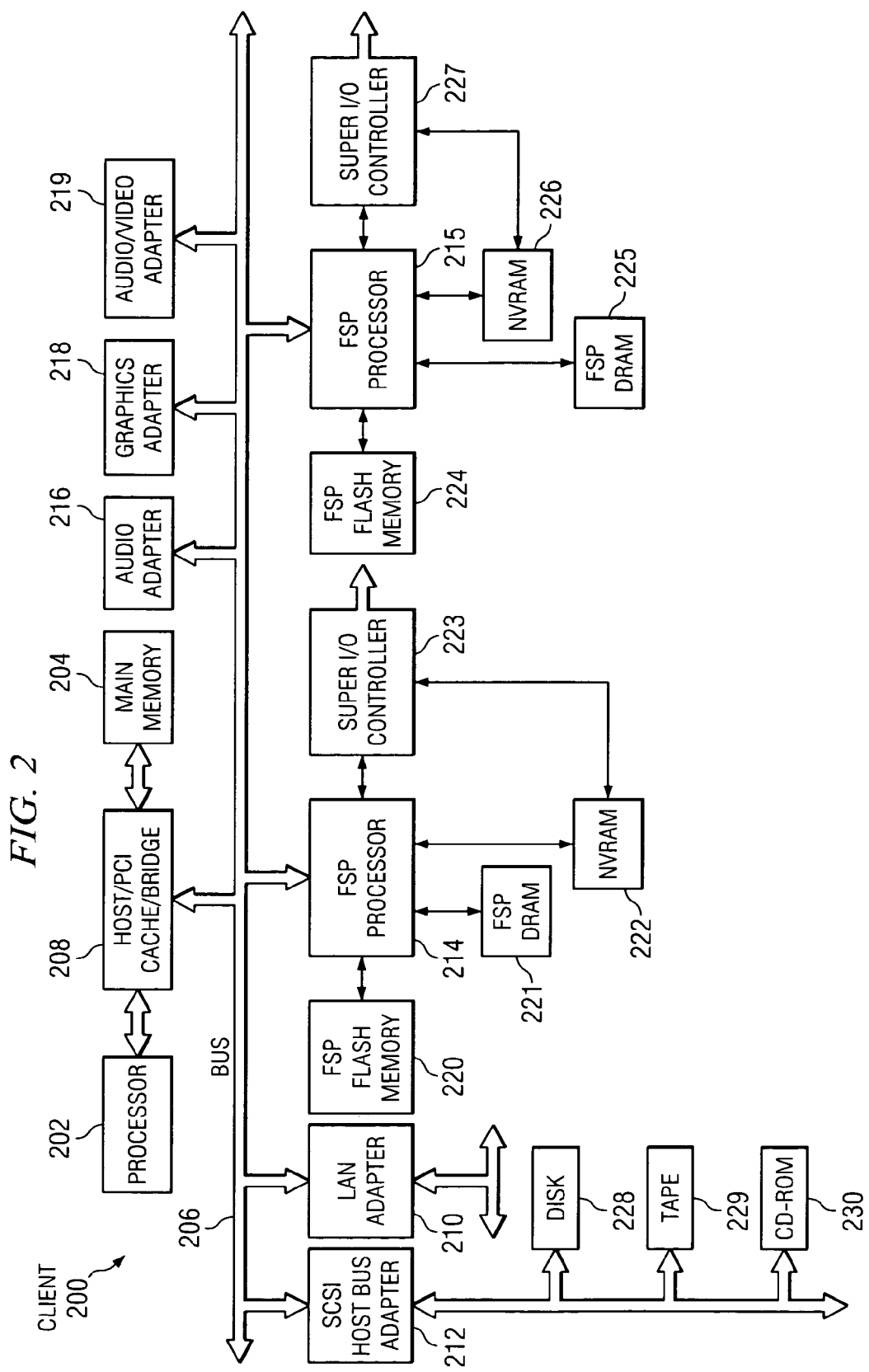
FIG. 2 is a block diagram of a data processing system in which the present invention may be implemented.

The illustrative embodiments relate to enhancing the boot time of a computer system using redundant service processors. FIGS. 1-2 are provided as exemplary diagrams of data processing environments in which the illustrative embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope of the illustrative embodiments.

With reference now to the figures, FIG. 1 depicts a pictorial representation of a network of data processing systems in which aspects of the illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different illustrative embodiments.

With reference now to FIG. 2, a block diagram of a data processing system is shown in which the present invention may be implemented. Data processing system 200 is an example of a computer, such as clients 110, 112, and 114 or servers 104 and 106 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212 and flexible service processor (FSP) processors 214 and 215 are connected to PCI local bus 206 by direct component connection. In contrast, audio adapter 216, graphics adapter 218, and audio/video adapter 219 are connected to PCI local bus 206 by add-in boards inserted into expansion slots.

FSP processor 214 is connected to FSP flash memory 220, FSP dynamic random access memory (DRAM) 221, NVRAM 222, and super I/O controller 223. FSP processor 215 is connected to FSP flash memory 224, FSP dynamic random access memory (DRAM) 225, NVRAM 226, and super I/O controller 227. Super I/O controllers 223 and 227 also have a connection to NVRAMs 222 and 226. Each group of components form a FSP unit or module. FSP flash memories 220 and 224 are examples of flash memory in which microcode used for an initial program load (IPL) may be stored. FSP DRAMs 221 and 225 are memories in which "load identifiers" LIDs or microcode from FSP flash memories 220 and 224 are loaded for execution by FSP processor 214 or 215. NVRAMs 222 and 226 may be used to hold data that is to be retained when the system is powered down. Super I/O controllers 223 and 227 provide an interface to devices, such as a keyboard, mouse, and microphone.

SCSI host bus adapter 212 provides a connection for hard disk drive 228, tape drive 229, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP®, which is available from Microsoft® Corporation. An object oriented programming system such as Java™ may run in conjunction with the operating system and provides calls to the operating system from Java™ programs or applications executing on data processing system 200. "Java" is a trademark of Sun Microsystems, Inc. Instructions for the operating system, the object-oriented programming system, and applications or programs are located on storage devices, such as hard disk drive 228, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 228, tape drive 229, and CD-ROM 230. In that case, the computer, to be properly called a client computer, includes some type of network communication interface, such as LAN adapter 210, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

In this example, flash memories 220 and 224 provide storage for an initial program load firmware, which is used to initialize the hardware in data processing system 200. The present invention provides an improved computer implemented method, data processing system, computer usable program code, and apparatus to indicate whether an initial program load firmware is defective. The mechanism of the present invention uses an indicator, such as a flag, to indicate whether this firmware is defective. This flag will prevent a data processing system, such as data processing system 200, from booting or initializing from defective firmware. Additionally, this flag also prevents firmware from being updated in a flash memory, such as flash memories 220 and 224 if a redundant device or copy of firmware is already defective.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, or in one or more peripheral devices 228-230.

The present invention utilizes both service processors during boot-up. The boot-up process splits the initialization tasks such that each service processor has a portion of the system to initialize. Splitting system initialization may reduce boot time by as much as half the time of one processor performing all initialization tasks.

Figure 3:
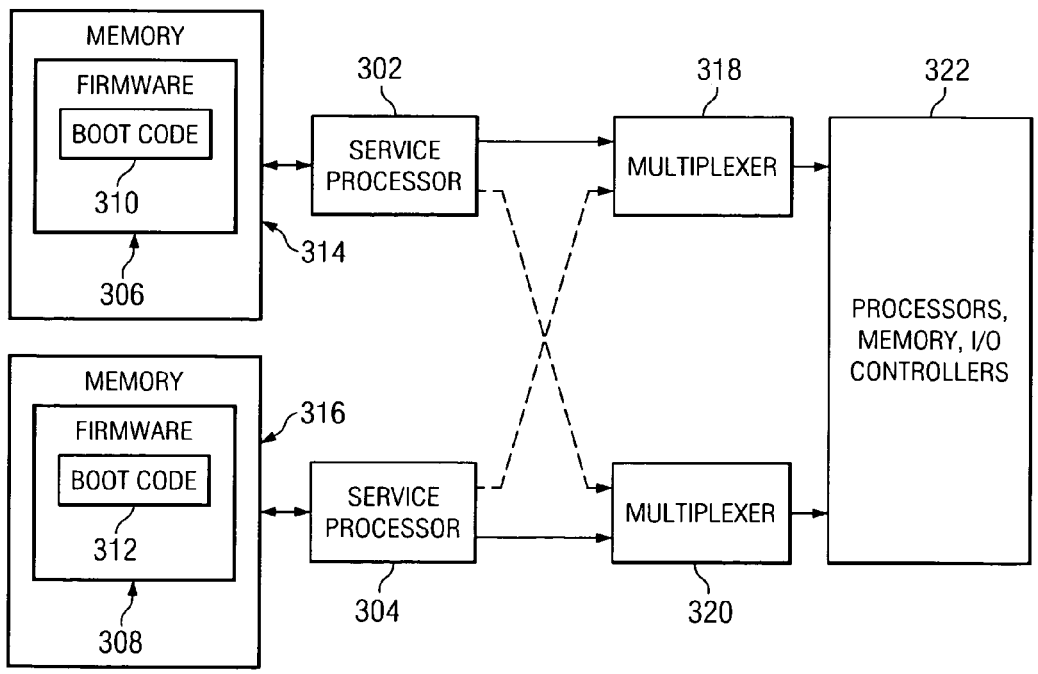
FIG. 3 depicts a diagram of components used in enhancing boot time in accordance with a preferred embodiment of the present invention.

Turning now to FIG. 3, a diagram of components used in enhancing boot time is depicted in accordance with a preferred embodiment of the present invention. In this example, service processors 302 and 304 initialize initial program load firmware 306 and 308 that contains boot code 310 and 312 that is loaded into memory 314 and 316 when a data processing system, such as data processing system 200 of FIG. 2 is booted or an initial program load begins. Service processors 302 and 304 may be service processors, such as flexible service processors 214 and 215 of FIG. 2. Memory 314 and 316 may be, for example, flash memory 220 and 224 in FIG. 2 where initial program load firmware 306 and 308 may be stored. In this example, initial program load firmware 306 and 308 may perform an initial check to verify that both service processor 302 and 304 are operational.

With service processors 302 and 304 both being operational, initial program load firmware 306 and 308 specify the specific portion of the system that each of service processor 302 and 304 is responsible for initializing. The initialization tasks each of service processor 302 and 304 perform are issued through multiplexers 318 and 320 to processors, memory, and I/O controllers 322. After each of service processor 302 and 304 perform their respective initialization tasks, control is returned to whichever service processor is designated as primary to complete the system boot-up and for runtime. In the event that the initial check performed by initial program load firmware 306 and 308 to verify that both service processors 302 and 304 are operational, determines that one of the service processors is not operational, the boot code reverts to a fail-over and the operational service processor initializes all boot-up initialization.

FIG. 4 depicts an exemplary system initialization in accordance with a preferred embodiment of the present invention. Upon start-up or boot of the computer, service processor 402 loads initial program load firmware that contains boot code specifying initialization steps 404-416. Also, upon start-up or boot of the computer, service processor 418 loads initial program load firmware that contains boot code specifying initialization tasks 420-432. Service processors 402 and 418 may be service processors such as flexible service processors 302 and 304 of FIG. 3. Both service processors 402 and 418 perform their respective power-on processes 404 and 420 and built-in self-test processes 406 and 422.

If both of service processors 402 and 418 are operational, then the initial program load firmware for each of service processor 402 and 418 specify the independent and non-redundant processes each service processor should perform for their respective part of the system. For service processor 402, processes 408, 410, 412, 414, and 416 are performed for its respective part of the system and for service processor 418, processes 424, 426, 428, 430, and 432 are performed for its respective part of the system. As a simple example, if a computer system of two processors, service processor 402 may initialize one processor and service processor 418 may initialize the other processor. As a more complicated example, if a computer system has sixty-four processors, service processor 402 may initialize thirty-two of the processors and service processor 418 may initialize the other thirty-two processors. A handshake may occur between service processors 402 and 418 as each initialization task is completed or as each service processor completes all of its specific tasks. After each of service processor 402 and 418 perform their respective initialization tasks, control is returned to whichever service processor is designated as primary to complete the system boot-up and for runtime. The splitting initialization tasks between service processors enhances boot time by utilizing both service processors to complete the initialization tasks, thereby cutting boot time by as much as half.

FIG. 5 is a flowchart depicting an exemplary enhanced boot time operation in accordance with a preferred embodiment of the present invention. As the operation begins, a start-up or boot of a computer occurs (step 502). Each service processor in the computer performs a power-on process followed by a built-in self-test (step 504). A determination is made as to if the service processors are operational (step 506). If the service processors are operational, the service processors work with each other by initializing independent and non-redundant specific tasks that are assigned to each of the service processors in the initial program load firmware (step 508). Once the tasks assigned to each service processors is completed, control is switched to a designated primary service processor and any remaining service processor is set to a backup status (step 510). If at step 506, only one service processor is operational, all of the initialization tasks are performed by the one operational service processor (step 512). After step 510 or 512, runtime firmware is loaded and started (step 514). System operation is then moved to the operating system (step 516), with the service process operation ending thereafter.

FIG. 6 is a flowchart depicting an exemplary firmware operation in accordance with a preferred embodiment of the present invention. As the operation begins, the firmware detects power-on of the service processor (step 602). The firmware then conducts a built-in self-test (step 604). A determination of the status of the self-test is then made (step 606). If the self-test fails, an error is sent to the other processor in the computer system (step 608), with the operation ending thereafter. If the self-test passes, then a notification is sent to the other processor indication the self-test passing (step 610).

The firmware then determines if the self-test of the other processor passed (step 612). If the self-test of the other processor passed, the firmware initiates independent and non-redundant specific tasks for that service processors defined in the initial program load firmware (step 614). A determination is then made as to whether the firmware indicates primary status (step 616). If at step 612, the self-test of the other processor failed, the processor asserts primary status (step 618) and proceeds to perform all of the initialization tasks (step 620), with the operation continuing to step 622 thereafter. If at step 616, the firmware indicates primary status, runtime firmware is loaded and started (step 622). System operation is then transferred to the operating system (step 624), with the service process operation ending thereafter. If at step 616, the firmware does not indicate primary status, backup status is asserted by the service processor (step 626), with the operation ending thereafter.

Thus, the present invention utilizes both service processors during boot-up. The boot-up process splits the initialization tasks such that each service processor has a portion of the system to initialize. Splitting system initialization may reduce boot time by as much as half the time of one processor performing all initialization tasks.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for enhancing boot time of a computer system, the method comprising:
    initializing firmware of an initial program load on a plurality of service processors;
    determining if any one of the plurality of service processors is non-operational, wherein
    determining if a service processor within the plurality of service processors is non-operational comprises:
        powering-up the plurality of service processors;
        running a built-in self-test on each service processor within the plurality of service processors; and
        determining whether the built-in self-test fails on at least one service processor within the plurality of service processors;
    responsive to determining that the plurality of service processors is operational, performing specific initialization tasks, wherein the specific initialization tasks are performed on the plurality of service processors and wherein each service processor in the plurality of service processors performs an independent non-redundant initialization task concurrently as another independent non-redundant initialization task is performed by another service processor in the plurality of service processors, the independent non-redundant initialization task being specified in initial program load firmware that is stored on a flash memory;
    switching control back to a primary service processor within the plurality of service processors;
    loading a set of runtime firmware, wherein the set of runtime firmware is loaded by the primary service processor;
    responsive to completing the loading of the set of runtime firmware, transferring operation to an operating system;
    responsive to determining a non-operational status of a service processor in the plurality of service processors, performing all initialization tasks by an operational service processor.

2. A data processing system comprising:
    a memory, the memory comprising firmware that is loaded in an initial program load; and
    a plurality of service processors, the plurality of service processors being checked by the initial program load firmware that is executed to determine whether any one of the plurality of service processors is non-operational, wherein the plurality of service processors:
        initializes the initial program load firmware on the plurality of service processors;
        performs specific initialization tasks in the initial program load firmware, responsive to the plurality of service processors being operational, wherein the specific initialization tasks are performed on the plurality of service processors and wherein each service processor in the plurality of service processors performs an independent non-redundant initialization task concurrently as other independent non-redundant initialization tasks are performed by another service processor in the plurality of service processors;
        switches control back to a primary service processor within the plurality of service processors, wherein the primary service processor;
        loads and executes a set of runtime firmware; and transfers operation to an operating system in response to completing the loading of the set of runtime firmware; and
    wherein the plurality of service processors include an operational service processor that performs all initialization tasks responsive to a service processor of the plurality of service processors being non-operational.

3. A computer program product for enhancing boot time of a computer system comprising a computer-readable medium including executable instructions, the computer program product comprising:
    computer executable program code initializing firmware of an initial program load on a plurality of service processors;
    computer executable program code determining if any one of the plurality of service processors is non-operational;
    computer executable program code performing specific initialization tasks, responsive to determining that the plurality of service processors is operational, wherein the specific initialization tasks are performed on the plurality of service processors, and wherein each service processor in the plurality of service processors performs independent non-redundant initialization tasks concurrently as other independent non-redundant initialization tasks are performed by another service processor in the plurality of service processors, and sends an acknowledgement to the plurality of processors as each independent non-redundant initialization task completes;
    computer executable program code switching control back to a primary service processor within the plurality of service processors;
    computer executable program code loading a set of runtime firmware, wherein the set of runtime firmware is loaded by the primary service processor;
    computer executable program code transferring operation to an operating system in response to completing the loading of the set of runtime firmware; and
    computer executable program code performing all initialization tasks by an operational service processor, responsive to determining a non-operational status of a service processor in the plurality of service processors.

* * * * *